(12) United States Patent
Babbitt et al.

(10) Patent No.: US 11,181,020 B2
(45) Date of Patent: Nov. 23, 2021

(54) CRANKCASE VENTILATION SYSTEMS

(71) Applicant: ONBOARD DYNAMICS, INC., Bend, OR (US)

(72) Inventors: Guy Robert Babbitt, Fort Collins, CO (US); Daniel Scott Pedersen, Fort Collins, CO (US)

(73) Assignee: ONBOARD DYNAMICS, INC., Bend, OR (US)

( * ) Notice: Subject to any disclaimer, the term of this patent is extended or adjusted under 35 U.S.C. 154(b) by 31 days.

(21) Appl. No.: 16/603,146

(22) PCT Filed: Mar. 28, 2018

(86) PCT No.: PCT/US2018/024825
§ 371 (c)(1),
(2) Date: Oct. 4, 2019

(87) PCT Pub. No.: WO2018/194804
PCT Pub. Date: Oct. 25, 2018

(65) Prior Publication Data
US 2020/0032682 A1    Jan. 30, 2020

Related U.S. Application Data

(60) Provisional application No. 62/486,605, filed on Apr. 18, 2017.

(51) Int. Cl.
*F01M 13/02*       (2006.01)
*F01M 13/00*       (2006.01)
(Continued)

(52) U.S. Cl.
CPC ........ *F01M 13/022* (2013.01); *F01M 13/028* (2013.01); *F01M 13/0011* (2013.01);
(Continued)

(58) Field of Classification Search
CPC .............. F01M 13/025; F01M 13/028; F01M 2013/027
See application file for complete search history.

(56) References Cited

U.S. PATENT DOCUMENTS 4,088,097 A     5/1978  Litz
4,962,745 A  * 10/1990  Ohno .................... F01M 11/08
                                                    123/533
(Continued)

FOREIGN PATENT DOCUMENTS

DE    102012202405 A1 *  8/2013  .......... F01M 13/028
GB         148361 A  * 12/1920  .......... F01M 13/028
(Continued)

OTHER PUBLICATIONS

Purdue compressor basics PDF. Published on Oct. 17, 2013. Retrieved from archive.org on Aug. 5, 2020. (Year: 2013).*
(Continued)

*Primary Examiner* — Michael A Kessler
(74) *Attorney, Agent, or Firm* — Leber IP Law; Shelly M. Fujikawa

(57) ABSTRACT

An internal combustion engine may be used to compress natural gas for vehicle fuel. The engine may contain a plurality of gas compression cylinders, at least one standard combustion cylinder to drive the compression cylinders, and a common crankshaft in a crankcase coupling the compression cylinders and the at least one standard combustion cylinder. Some combustible gas being compressed may leak past the piston rings of the compression cylinders into the engine crankcase posing a safety concern. This invention eliminates this concern by actively flushing the crankcase at a higher rate than normal.

19 Claims, 3 Drawing Sheets

(51) Int. Cl.
*F02B 75/02* (2006.01)
*F02M 35/10* (2006.01)

(52) U.S. Cl.
CPC ............ *F01M 2013/0044* (2013.01); *F02B 2075/027* (2013.01); *F02M 35/10222* (2013.01)

(56) References Cited

U.S. PATENT DOCUMENTS

| | | | |
|---|---|---|---|
| 6,892,715 B2* | 5/2005 | Norrick | F02M 25/06 |
| | | | 123/572 |
| 7,011,071 B1 | 3/2006 | Decuir, Jr. | |
| 10,760,516 B2* | 9/2020 | Takahashi | F02D 41/22 |
| 2009/0090337 A1* | 4/2009 | Asanuma | F01M 13/022 |
| | | | 123/574 |
| 2010/0077982 A1 | 4/2010 | Chapman et al. | |
| 2010/0313830 A1 | 12/2010 | Ruppel et al. | |
| 2011/0073083 A1 | 3/2011 | Shiraishi et al. | |
| 2015/0285182 A1* | 10/2015 | Hagen | F02M 21/0218 |
| | | | 123/193.3 |

FOREIGN PATENT DOCUMENTS

| | | | | |
|---|---|---|---|---|
| WO | WO-2009122616 A1 * | 10/2009 | ......... | F01M 13/0011 |
| WO | WO-2016126695 A1 * | 8/2016 | ............... | B60K 6/12 |

OTHER PUBLICATIONS

English machine translation of WO 2009122616 A1 provided by WIPO Patentscope (Year: 2020).*
Vacuum generation due to downward movement of piston in combustion chamber.pdf (Year: 2021).*
International Search Report and Written Opinion issued on International Application No. PCT/US2018/024825, dated Jun. 11, 2018, 8 pages.

* cited by examiner

CRANKCASE VENTILATION SYSTEMS

STATEMENT REGARDING FEDERALLY SPONSORED RESEARCH OR DEVELOPMENT

This invention was made with government support under DE-AR0000490 awarded by the U.S. Department of Energy. The government has certain rights in the invention.

BACKGROUND

Natural gas is an attractive fuel for vehicles due to its low cost and reduced emissions, including greenhouse gases. However, for effective use as a vehicle fuel, natural gas must be compressed to high pressure (typically 3600 to 5000 psi).

One appealing way to compress gas is to use an internal combustion engine, e.g., an automotive engine, to package gas compression and the power required to do so into the same machine. Such "on-board" dual-mode compression systems are described in U.S. Pat. No. 9,528,465, the entire disclosure of which is incorporated by reference herein. FIG. 1 shows an internal combustion engine 16 containing a plurality of gas compression cylinders 10, at least one standard combustion cylinder 12 to drive the plurality of compression cylinders 10, and a common crankshaft in a crankcase 14 coupling the plurality of compression cylinders 10 and the at least one standard combustion cylinder 12.

The plurality of compression cylinders 10 are in fluid communication with each other and are configured to compress gas in a series of stages. The plurality of compression cylinders 10 includes an initial compression cylinder 18 in fluid communication with a gas inlet 20, a final compression cylinder 22 in fluid communication with a gas outlet 24, and optional intermediate compressors such as intermediate compressors 26 and 28. A cylinder head (not shown) of the plurality of compression cylinders 10 includes a valve system 30 to regulate the flow of gas into and out of the compression cylinders. The flow of gas into a compression cylinder may be regulated using a check valve, e.g., check valve 32. The flow of gas out of a compression cylinder may be regulated using a check valve, e.g., check valve 34.

Engine valves 36 supply air from intake manifold 42 and fuel to the at least one standard combustion cylinder 12 and vent the exhaust of the at least one standard combustion cylinder 12 to the exhaust manifold 38 and the exhaust system 40.

As shown in FIG. 1, during a gas compression cycle, gas travels from gas inlet 20 to initial compression cylinder 18 via a conduit 54 passing through check valve 32. The piston of initial compression cylinder 18, powered by the at least one combustion cylinder 12, compresses the gas. Check valve 34 allows the compressed gas to flow out of initial compression cylinder 18. The gas is serially compressed until it leaves final compression cylinder 22 and travels to gas outlet 24.

This configuration means that the two parts of the engine—the plurality of compression cylinders 10 and the at least one combustion cylinder 12 share—the same engine crankcase 14. Some amount of the compression gas will leak past the piston rings of the plurality of compression cylinders 10 into the engine crankcase 14. For combustible compression gases, such as natural gas, the leaked gas into crankcase 14 will mix with air and create a potentially combustible mixture, which poses a safety concern.

The rate of compression gas leaking into the crankcase may depend on the design and use of a particular engine. Factors such as the type of rings used in the original engine, power level of the engine during the compression process, and age of the engine (i.e., total hours in operation) may influence this rate. One of ordinary skill in the art may determine the rate of compressing gas leaking into the crankcase (i.e., the blow-by rate) by operating a test engine for hundreds or thousands of hours. For example, the rate of compressing gas leaking into the crankcase in a dual mode engine may be less than or equal to 20%, less than or equal to 10%, less than or equal to 5%, or less than or equal to 2% of the flow rate of gas being compressed. The flow rate of gas being compressed may be between 40 and 80 standard cubic feet per minute (SCFM) for a V8 engine of 6 to 7 liters of displacement. For larger or smaller engines, these flow rates would be proportionately larger or smaller. For example, the flow rate of gas being compressed may be between 10 and 50 SCFM, between 20 and 60 SCFM, between 70-110 SCFM, between 80-120 SCFM, between 90-130 SCFM, or between 100-200 SCFM.

The leakage of compressed natural gas in this type of dual mode engine is of particular concern compared to a combustion engine with no compression system and compared to a gas compression system with dedicated compression cylinders. In a combustion engine with no compression system, virtually all the fuel is burnt in the combustion cylinders so gas leakage into the crankcase is less of a concern. In a gas compression system with dedicated compression cylinders, the gas compression cylinders are specifically designed for gas compression and are not adjacent to the crankcase and, therefore, an insignificant amount of gas leakage occurs.

FIG. 1 shows a typical PCV (positive crankcase ventilation) system that has been used to flush the crankcase with fresh air to some degree in an attempt to purge combustion gas build-up. In the system shown in FIG. 1, crankcase 14 and outside air intake 46 are in fluid communication with both intake manifold 42 and a breather 52. A PCV valve 44 is disposed between crankcase 14 and intake manifold 42. A portion of the intake air is pulled into the crankcase via the breather 52, then exhausted to the intake manifold 42 through the PCV valve 44 which ensures that air only flows out of the crankcase. The flow through the crankcase 14 is driven by the pressure differential between an intake air filter 48 (close to ambient pressure) and the intake manifold 42 (typically at a vacuum with respect to ambient pressure.) This pressure differential is created in part by the downward motion of the moving piston of the at least one combustion cylinder 12.

A throttle 50 is disposed between a junction 56 and intake manifold 42 and modulates the flow of intake air into the intake manifold 42. Junction 56 routes air from outside air intake 46 to either breather 52 or throttle 50.

The air flow rates of this pressure differential-driven PCV system may not be high enough to purge sufficiently compression gas that has leaked into the crankcase. The flow rates for this PCV system may be less than the rate of blow-by, i.e., the rate of compressing gas leaking into the crankcase. For example, the flow rate for this PCV system may be less than or equal to 20%, less than or equal to 10%, less than or equal to 5%, less than or equal to 2%, or less than or equal to 1% of the flow rate of gas being compressed.

Others have tried to solve the problem of gas leaking into the crankcase by sealing around the pistons of the compression cylinders. These methods may only limit leakage, not eliminate the possibility of a combustible mixture.

SUMMARY

The present invention augments the flushing of the crankcase by routing more air through the crankcase so that combustible mixtures may never be achieved. Several ways of additional purging are exemplified.

One such crankcase ventilation system for an engine includes a crankcase of the engine in fluid communication with both an intake manifold of the engine and a breather; an outside air intake in fluid communication with both the intake manifold and the breather; a check valve disposed between the crankcase and the intake manifold; and a blower in fluid communication with the breather.

Another crankcase ventilation system for an engine includes a crankcase of an engine in fluid communication with a breather and an intake manifold of the engine; a check valve disposed between the crankcase and the intake manifold; and an outside air intake in fluid communication with the breather; wherein all the outside air from the outside air intake is routed through the crankcase before being routed into the intake manifold.

Methods of venting gas from a crankcase of an engine that compresses gas include blowing outside air through the crankcase at a rate equal to or more than the rate of compressing gas leaking into the crankcase. When a blower is included in the crankcase ventilation system, blowing outside air through the crankcase comprises turning on the blower to drive air flow through the crankcase. When all outside air from the outside air intake is routed through the crankcase before being routed into the intake manifold in the crankcase ventilation system, blowing outside air through the crankcase comprises providing low pressure at the intake manifold to pull outside air from the breather, through the crankcase, and into the intake manifold.

DETAILED DESCRIPTION

Several ways for eliminating the concern of combustible mixtures in the crankcase are detailed. Generally, the crankcase is vented by blowing outside air (air external to the engine) through the crankcase at a rate such that no combustible mixtures will cause safety issues. The flow rate of air may be equal to or more than the blow-by rate. For example, the flow rate of air may be more than or equal to 100%, more than or equal to 50%, more than or equal to 20% of the flow rate of gas being compressed.

Figure 1:
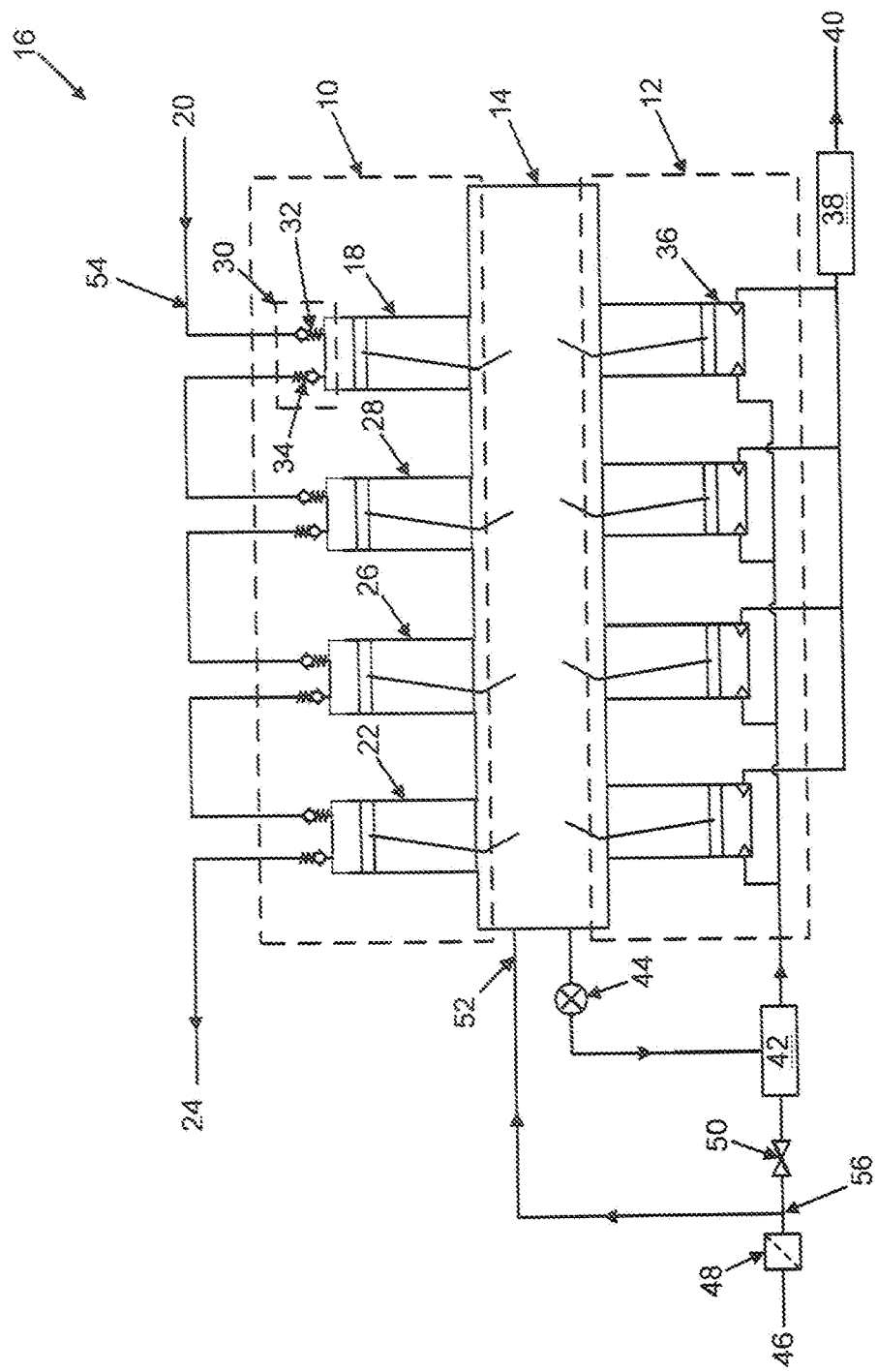
FIG. 1 is a schematic for an engine containing a gas compressor with a typical crankcase ventilation system.
Figure 2:
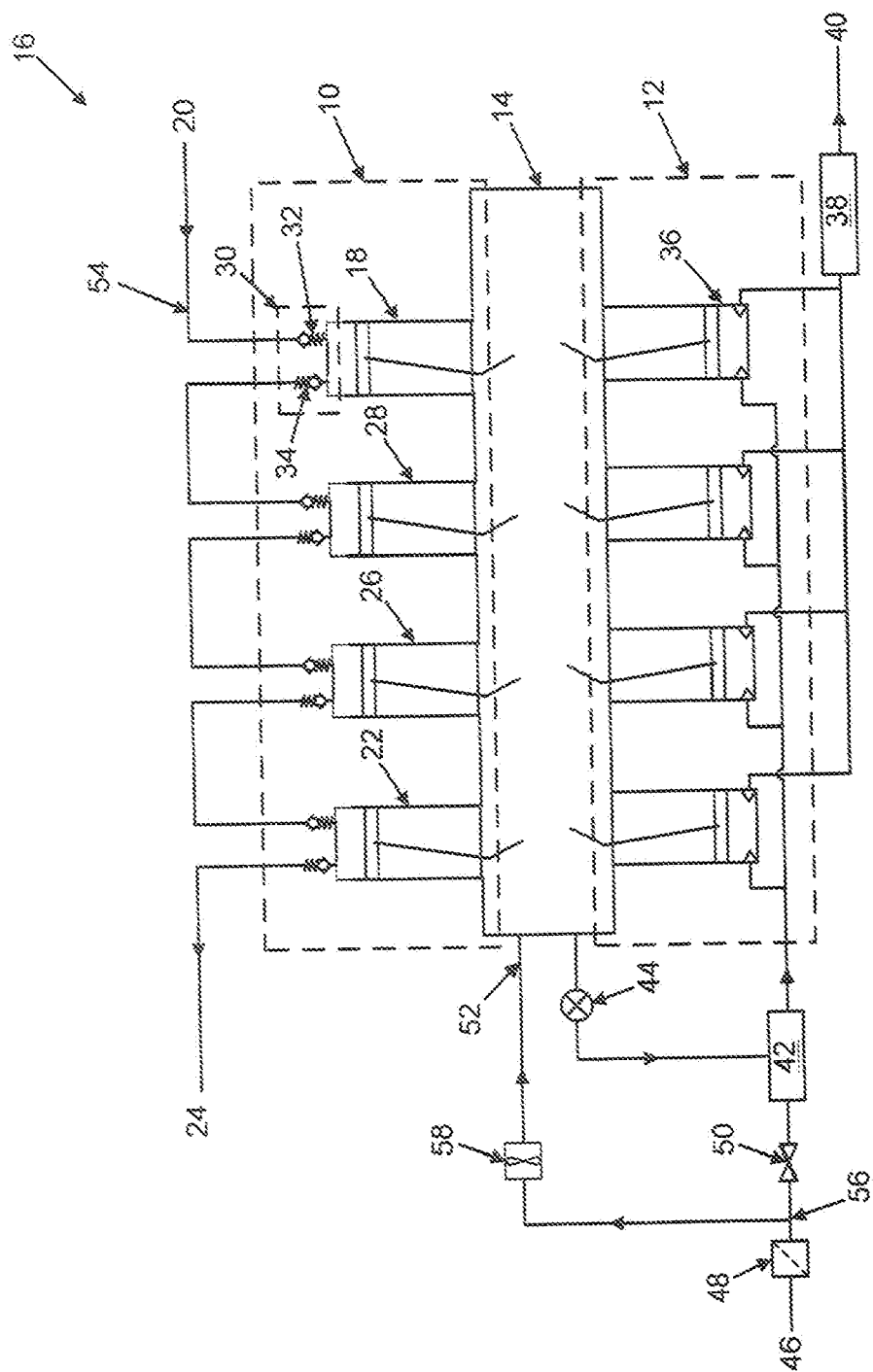
FIG. 2 is a schematic for an engine containing a gas compressor with a higher-flow crankcase ventilation system.

One way to vent the crankcase is depicted in FIG. 2. The routing of the air into and out of the crankcase is the same as FIG. 1, but the flow rate is enhanced by adding a blower 58 in fluid communication with breather 52 to drive airflow through crankcase 14.

Blower 58 may be selected based on the flow rate that is desired to prevent safety issues as discussed above and the pressure drop that flow experiences as it travels through a particular engine crankcase. It is likely the pressure drop would be less than 3 psi, less than 5 psi, or less than 10 psi. For example, after measuring the blow-by rate as discussed above, one of ordinary skill in the art could select a blower with a potential flow rate, such as a volume per unit time, that equals or exceeds (e.g., greater than or equal to 10x, greater than or equal to 20x, greater than or equal to 50x, or greater than or equal to 100x) that of the measured blow-by rate.

For a lower pressure drop, a centrifugal compressor could be used as blower 58. For a larger pressure drop, a positive displacement compressor, such as a piston compressor, would be preferred. However, for some situations, one of ordinary skill in the art may make a different choice for blower 58. The blower may be run continuously so gas does not build-up in the crankcase.

Figure 3:
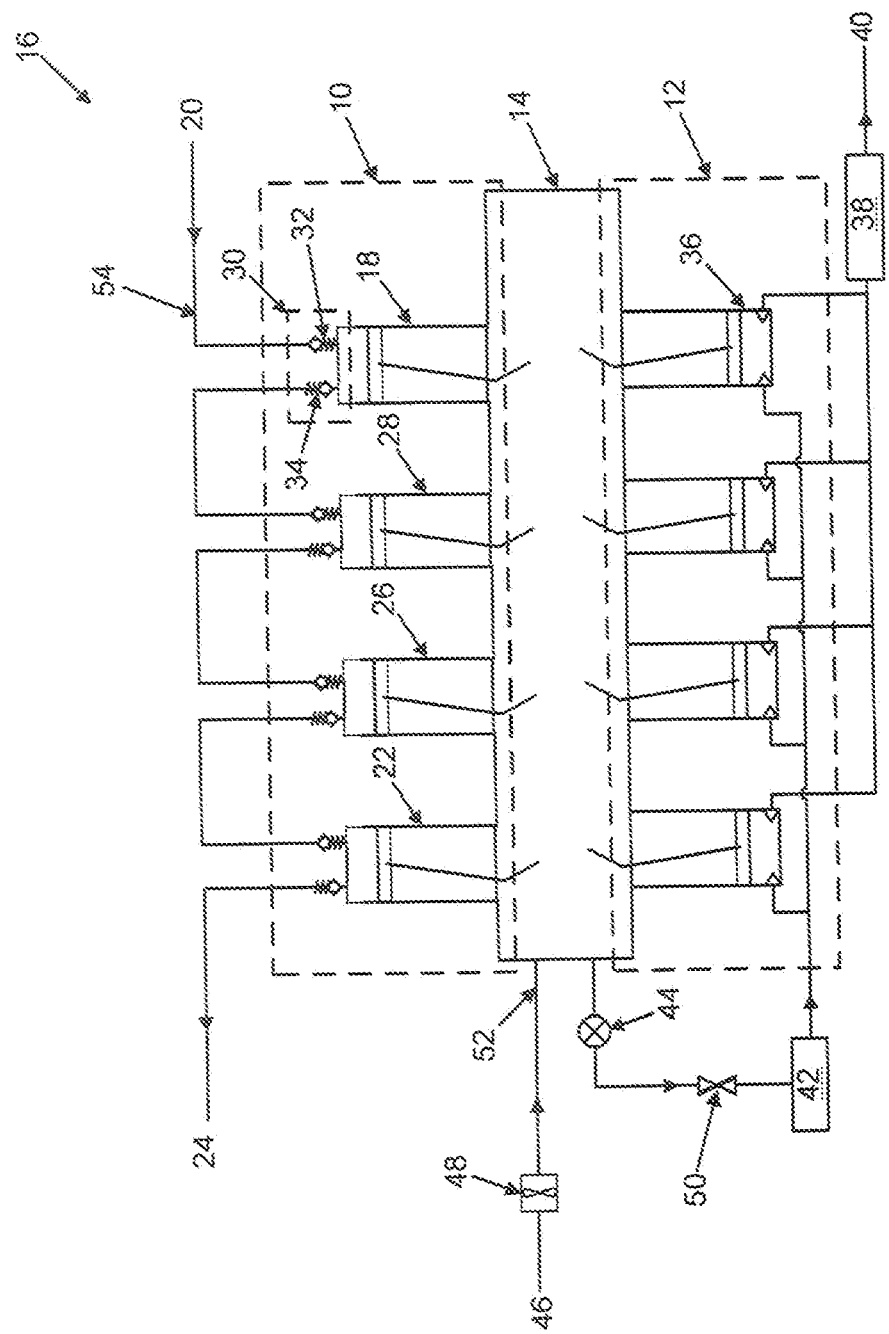
FIG. 3 is a schematic for an engine containing a gas compressor with complete crankcase ventilation.

Another way to vent the crankcase is depicted in FIG. 3. Like FIG. 1 and FIG. 2, crankcase 14 is in fluid communication with breather 52 and intake manifold 42 and outside air intake 46 is in fluid communication with breather 52. However, as shown in FIG. 3, the PCV valve 44 is disposed between crankcase 14 and throttle 50 and throttle 50 is disposed between PCV valve 44 and intake manifold 42. Intake air filter 48 is disposed between outside air intake 46 and breather 52.

As depicted in FIG. 3, rather than just a portion of the engine's intake air flowing through crankcase 14 as in FIG. 1 and FIG. 2, all the outside air from the outside air intake 46 is routed through the crankcase 14, via breather 52, before being routed into intake manifold 42 via PCV valve 44 and throttle 50. In this embodiment, no blower is used. Like FIG. 1 and FIG. 2, low pressure at intake manifold 42 pulls outside air from breather 52, through crankcase 14, and into intake manifold 42. The low pressure may be from 1 psi to 14 psi, from 4 psi to 12 psi, or from 6 psi to 10 psi. This configuration results in a crankcase that is flushed with air at such a high rate that any combustible, compressed gas leaking into the crankcase is highly diluted and cannot be concentrated enough to form a combustible mixture.

OTHER EMBODIMENTS

While four gas compression cylinders are exemplified, one of ordinary skill in the art would read these descriptions understanding that as few as two cylinders or more than four cylinders may be used. In addition, while four combustion cylinders are exemplified, one of ordinary skill in the art would read these descriptions understanding that as few one cylinder or more than four cylinders may be used.

While one cylinder compresses the gas and the gas moves to the next cylinder for further compression is exemplified, one of ordinary skill in the art understands that multiple cylinders could compress a gas to a single lower pressure and the gas then may move to another set of multiple compression cylinders for further compression.

The present invention is not to be limited in scope by the specific embodiments described herein. Indeed, various modifications of the invention in addition to those described herein will be apparent to those skilled in the art from the foregoing description. Such modifications are intended to fall within the scope of the appended claims.

All references cited herein, including all patents, published patent applications, and published scientific articles and books, are incorporated by reference in their entireties for all purposes.

What is claimed is:

1. A crankcase ventilation system for an engine, comprising:
   a crankcase of the engine in fluid communication with both an intake manifold of the engine and a breather;
   an outside air intake in fluid communication with both the intake manifold and the breather;

a positive crankcase ventilation (PCV) valve disposed between the crankcase and the intake manifold;
a junction for routing outside air from the outside air intake to either the breather or the intake manifold; and
a blower, in fluid communication with the breather, disposed between the junction and the breather,
wherein the engine comprises at least one standard combustion cylinder driving a plurality of gas compression cylinders, configured to compress gas in a series of stages, and a common crankshaft in the crankcase coupling the at least one standard combustion cylinder and the plurality of compression cylinders.

2. The crankcase ventilation system of claim 1, wherein the blower is a centrifugal compressor.

3. The crankcase ventilation system of claim 1, further comprising a throttle disposed between the junction and the intake manifold, wherein the throttle modulates outside air to the intake manifold.

4. The crankcase ventilation system of claim 1, further comprising an intake air filter disposed between the outside air intake and the junction.

5. A crankcase ventilation system for an engine, comprising: a crankcase of an engine in fluid communication with a breather and an intake manifold of the engine; a positive crankcase ventilation (PCV) valve disposed between the crankcase and the intake manifold; a throttle disposed between the PCV valve and the intake manifold; and an outside air intake in fluid communication with the breather; wherein all the outside air from the outside air intake is routed through the crankcase before being routed into the intake manifold, wherein the engine comprises at least one standard combustion cylinder driving a plurality of gas compression cylinders, configured to compress gas in a series of stages, and a common crankshaft in the crankcase coupling the at least one standard combustion cylinder and the plurality of compression cylinders.

6. The crankcase ventilation system of claim 5, further comprising an intake air filter disposed between the outside air intake and the breather.

7. A method of venting gas comprising:
providing the crankcase ventilation system of claim 1; and
blowing outside air through the crankcase at a rate equal to or more than the rate of compressing gas leaking into the crankcase,
wherein blowing outside air through the crankcase comprises turning on the blower to drive air flow through the crankcase.

8. The method of claim 7, wherein the rate of gas leaking into the crankcase is less than or equal to 20% of the flow rate of gas being compressed.

9. A method of venting gas comprising:
providing the crankcase ventilation system of claim 5; and
blowing outside air through the crankcase at a rate equal to or more than the rate of compressing gas leaking into the crankcase,
wherein blowing outside air through the crankcase comprises providing low pressure at the intake manifold to pull outside air from the breather, through the crankcase, and into the intake manifold.

10. The method of claim 9, wherein providing low pressure at the intake manifold comprises moving down a piston of the at least one combustion cylinder.

11. The crankcase ventilation system of claim 1, wherein the plurality of gas compression cylinders comprises an initial compression cylinder in fluid communication with a final compression cylinder.

12. The crankcase ventilation system of claim 1, wherein a cylinder head of the plurality of compression cylinders comprises a valve system configured to regulate gas flow into and out of the plurality of compression cylinders.

13. The crankcase ventilation system of claim 5, wherein the plurality of gas compression cylinders comprises an initial compression cylinder in fluid communication with a final compression cylinder.

14. The crankcase ventilation system of claim 5, wherein a cylinder head of the plurality of compression cylinders comprises a valve system configured to regulate gas flow into and out of the plurality of compression cylinders.

15. The method of claim 7, wherein the plurality of gas compression cylinders comprises an initial compression cylinder in fluid communication with a final compression cylinder.

16. The method of claim 7, wherein a cylinder head of the plurality of compression cylinders comprises a valve system configured to regulate gas flow into and out of the plurality of compression cylinders.

17. The method of claim 9, wherein the rate of gas leaking into the crankcase is less than or equal to 20% of the flow rate of gas being compressed.

18. The method of claim 9, wherein the plurality of gas compression cylinders comprises an initial compression cylinder in fluid communication with a final compression cylinder.

19. The method of claim 9, wherein a cylinder head of the plurality of compression cylinders comprises a valve system configured to regulate gas flow into and out of the plurality of compression cylinders.

* * * * *